(12) United States Patent
Shimizu et al.

(10) Patent No.: US 7,282,005 B2
(45) Date of Patent: Oct. 16, 2007

(54) HYDRAULIC CONTROL APPARATUS OF AUTOMATIC TRANSMISSION

(75) Inventors: Tetsuya Shimizu, Anjo (JP); Kenichi Tsuchida, Anjo (JP); Akitomo Suzuki, Anjo (JP); Kazunori Ishikawa, Anjo (JP); Yoshinori Shibayama, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 108 days.

(21) Appl. No.: 11/073,594

(22) Filed: Mar. 8, 2005

(65) Prior Publication Data

US 2005/0202917 A1  Sep. 15, 2005

(30) Foreign Application Priority Data

Mar. 9, 2004  (JP) .............................. 2004-066449

(51) Int. Cl.
*F16H 61/28* (2006.01)
(52) U.S. Cl. ...................... 475/127; 475/123; 192/85 R
(58) Field of Classification Search ................. 475/127, 475/128, 116, 118, 120, 123; 477/127, 138, 477/158, 160, 163, 164
See application file for complete search history.

(56) References Cited

U.S. PATENT DOCUMENTS 5,005,444 A * 4/1991 Kimura et al. .............. 477/117

FOREIGN PATENT DOCUMENTS

JP  2002-266995 A  9/2002

* cited by examiner

*Primary Examiner*—Richard M. Lorence
*Assistant Examiner*—Edwin A Young
(74) *Attorney, Agent, or Firm*—Sughrue Mion Pllc.

(57) ABSTRACT

A hydraulic control apparatus of an automatic transmission. The hydraulic control apparatus of the automatic transmission has a hydraulic servo for controlling an engaging state of a clutch C-1 on the basis of supplied oil pressure, a linear solenoid valve for C-1 for outputting signal pressure by adjusting the oil pressure, a control valve for outputting control pressure provided by adjusting line pressure $P_L$ on the basis of the signal pressure of the linear solenoid valve for C-1, and a C-1 apply relay valve for inputting, selectively switching and outputting the control pressure and the line pressure $P_L$ to the hydraulic servo. An orifice for regulating the flow rate of the oil is arranged in an oil path g for inputting the line pressure $P_L$ to this C-1 apply relay valve.

11 Claims, 9 Drawing Sheets

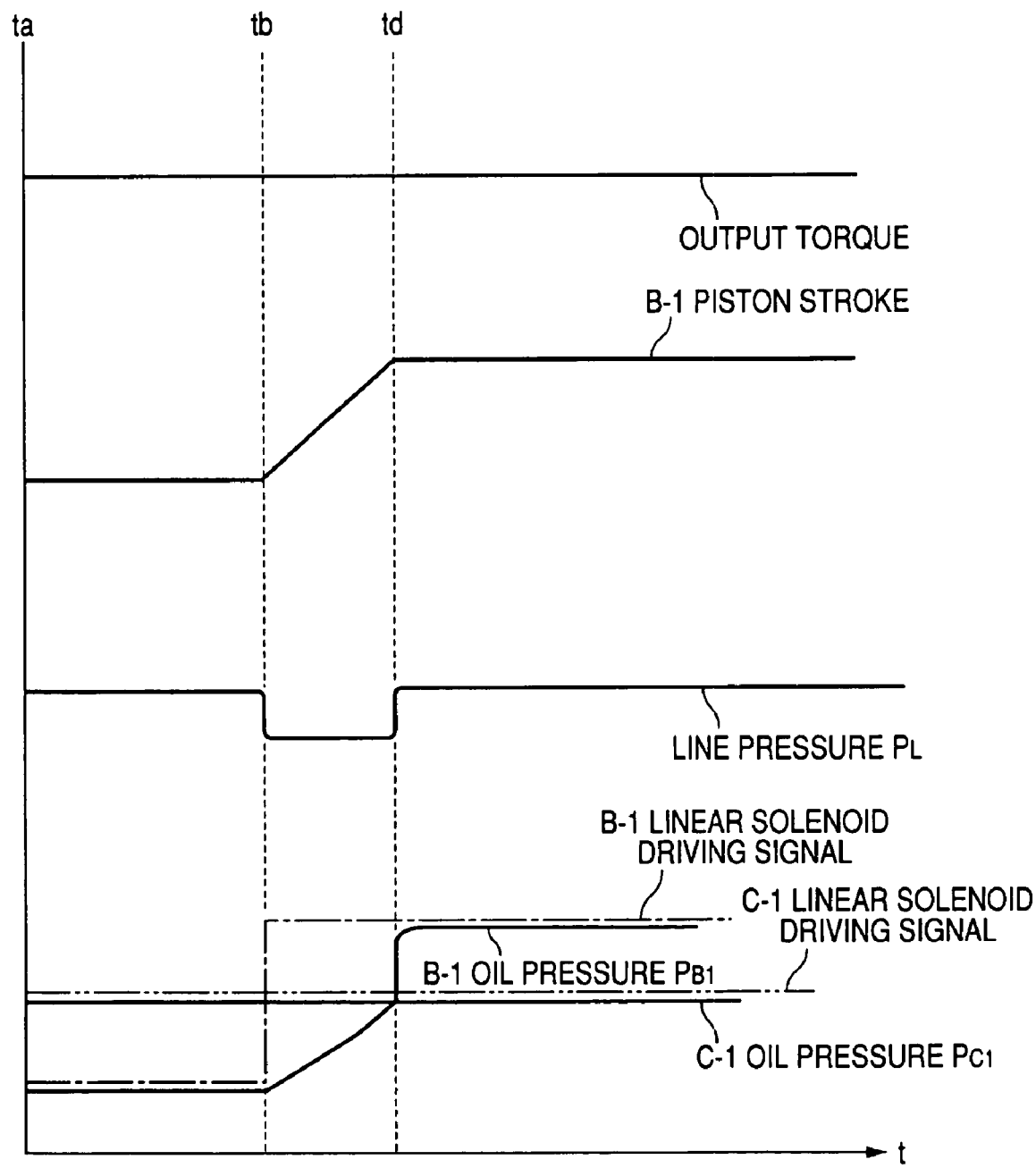

| POSITION | | CLUTCH | | | BRAKE | | OWC |
|---|---|---|---|---|---|---|---|
| | | C-1 | C-2 | C-3 | B-1 | B-2 | F-1 |
| P | | X | X | X | X | X | X |
| R | V≤7 | X | X | O | X | O | X |
| | V>7 | X | X | X | X | O | X |
| | N cont. | X | X | △ | △ | O | X |
| N | | X | X | X | X | X | X |
| D·4·3·2 | 1ST | O | X | X | X | X | O |
| | E/G BRAKE | O | X | X | X | O | O |
| | 2ND | O | X | X | O | X | X |
| | N cont. | △ | X | X | △ | X | O |
| | 3RD | O | X | O | X | X | X |
| | 4TH | O | O | X | X | X | X |
| | 5TH | X | O | O | X | X | X |
| | 6TH | X | O | X | O | X | X |

O SHOWS ENGAGEMENT AND X SHOWS RELEASE AND
△ SHOWS NEUTRAL CONTROL (HILL HOLD CONTROL)

HYDRAULIC CONTROL APPARATUS OF AUTOMATIC TRANSMISSION

INCORPORATION BY REFERENCE

This application claims the priority of Japanese Patent Application No. 2004-066449 filed on Mar. 9, 2004, the specification, drawings and abstract thereof, are incorporated herein by reference in their entirety.

BACKGROUND OF THE INVENTION

1. Field of the Invention

The present invention relates to a hydraulic control apparatus of an automatic transmission for controlling an engaging state of a frictional engaging element in the automatic transmission mounted to, for example, a vehicle, by oil pressure, and more particularly relates to a hydraulic control apparatus of the automatic transmission having a switching valve for selectively switching and supplying control pressure controlled by a solenoid valve and line pressure to a hydraulic servo of the frictional engaging element.

2. Description of the Related Art

The automatic transmission mounted to the vehicle conventionally has the hydraulic control apparatus for controlling the engaging state of the frictional engaging element such as a clutch, a brake, etc. by hydraulic control for supplying the engaging state to each of the respective hydraulic servos. When an engaging operation and a release operation of the frictional engaging element are particularly performed in this hydraulic control, it is necessary to finely control the supplied oil pressure by the solenoid valve and a control valve, etc. controlled by the solenoid valve, and prevent a sudden torque change (speed change shock) by smoothly performing the engaging operation and the release operation.

However, for example, when the oil pressure after the engaging operation, i.e., during the engagement, is continuously supplied through the above control valve, there is a fear that running ability is injured if the control valve were to stick. Therefore, a structure for switching the oil pressure (hereinafter set to "control pressure") controlled by the solenoid valve and the line pressure by the switching valve is proposed (JP-A-2002-266995).

Here, the conventional hydraulic control apparatus will be briefly explained. FIG. 7 is a schematic view showing a hydraulic circuit of the conventional hydraulic control apparatus. FIG. 8 is a time chart showing an experimental example at an N-D shift time using the conventional hydraulic control apparatus. As shown in FIG. 7, modulator pressure $P_{MOD}$ for adjusting line pressure $P_L$ adjusted by a primary regulator valve, etc. with respect to the oil pressure from an oil pump operated in association with an unillustrated engine, so as not to further become a predetermined pressure or more, is inputted to a linear solenoid valve 21 for C-1. When the linear solenoid valve 21 for C-1 is operated and controlled, the modulator pressure $P_{MOD}$ is adjusted and signal pressure $P_{SLC1}$ is outputted from a port 21b. The signal pressure $P_{SLC1}$ is outputted to an oil chamber 22a of the control valve 22 and an oil chamber 23a of a C-1 apply relay valve 23.

On the other hand, the above line pressure $P_L$ is inputted to a port 22c of the above control valve 22 and a port 23d of the above C-1 apply relay valve 23. Further, the control pressure provided by adjusting the line pressure $P_L$ inputted to the port 22c of the control valve 22 is outputted from a port 22d and is inputted to a port 23c of the C-1 apply relay valve 23. The above modulator pressure $P_{MOD}$ is inputted to an oil chamber 23b of the C-1 apply relay valve 23.

When the engaging operation of the clutch C-1 is performed, the modulator pressure $P_{MOD}$ is normally inputted to the oil chamber 23b of the C-1 apply relay valve 23. A spool 23p is located in an upper position and ports 23c and 23e are communicated with each other. Thus, the control pressure outputted by the control valve 22 is supplied to a C-1 hydraulic servo 25. However, for example, when the oil temperature is high and an engine rotation number is low and the discharge amount of the oil pump is small, there is a fear that problems are caused.

Namely, as shown in FIG. 8, for example, when a driver sets an unillustrated shift lever to an N-D shift (shifts the shift lever from a neutral range to a drive range) at a time point t1, a so-called back-lash filling operation (fast fill) for making an unillustrated piston of the C-1 hydraulic servo 25 approach until a frictional plate is started at a time point t2. Thus, the linear solenoid valve 21 for C-1 is electronically controlled and operated, and the oil is flowed into the linear solenoid valve 21 for C-1 (and oil paths b, c, d and oil chambers 22a, 23a), and the line pressure $P_L$ (modulator pressure $P_{MOD}$) is reduced during time until a time point t3.

Therefore, the oil pressure of the oil chamber 23b of the C-1 apply relay valve 23 is reduced, and the spool 23p of the C-1 apply relay valve 23 is moved in error to a lower position at the time point t3 by the signal pressure $P_{SLC1}$ inputted to the oil chamber 23a and the biasing force of a spring 23s. Thereafter, the port 23d and the port 23e are communicated with each other, and the oil is flowed into an operating oil chamber of the C-1 hydraulic servo 25 and the line pressure $P_L$ (modulator pressure $P_{MOD}$) is further reduced (i.e., the spool 23p is located in the lower position as it is). Thus, the piston starting a stroke at a time point t4 is further pressed in addition to the back-lash filling operation, and the clutch C-1 is engaged at a time point t5. Therefore, output torque is changed as shown in FIG. 8. Namely, a speed change shock is caused by engaging the clutch C-1 in the back-lash filling operation in which no clutch C-1 is originally engaged.

It is considered that such a problem is caused at an N-R shift (shift from the neutral range to a reverse range) time, a downshift time of a coast (engine brake) state, a neutral control (control for maintaining the clutch for transmitting power in a state just before the engagement in a running range) time, etc. as well as the N-D shift time. Further, for example, even when the line pressure $P_L$ is merely reduced by operating one linear solenoid valve and no switching valve is operated in error, there is also a case in which the line pressure is reduced in flowing the oil into the hydraulic servo of another frictional engagement element and the switching valve is operated in error. A similar problem is also caused in this case.

The above problems can be solved by preventing the reduction in the line pressure $P_L$ (modulator pressure $P_{MOD}$) by increasing the discharge amount of the oil pump, i.e., by preventing the erroneous operation of the switching valve. However, it is necessary to increase an idling rotation number, the size of the oil pump, etc. to increase the discharge amount of the oil pump. Accordingly, these increases obstruct the improvement of fuel cost of the vehicle and compact formation of the automatic transmission.

SUMMARY OF THE INVENTION

The exemplary embodiments of the present invention address the problems of the conventional art and provide a hydraulic control apparatus of an automatic transmission able to prevent the speed change shock without obstructing the improvement of the fuel cost of the vehicle and the compact formation of the automatic transmission.

The first aspect of the invention (e.g., see FIGS. 1 to 6B) resides in a hydraulic control apparatus of an automatic transmission (10) comprising a predetermined hydraulic servo (e.g., 25, 45) for controlling an engaging state of a frictional engaging element (e.g., C-1, B-1) on the basis of supplied oil pressure (e.g., $P_{C1}$, $P_{B1}$), control pressure output element (e.g., 21, 22, 41, 42) having a solenoid valve (e.g., 21, 41) and adjusting line pressure ($P_L$) and outputting control pressure (e.g., $P_{CONTC1}$, $P_{CONTB1}$) supplied to the predetermined hydraulic servo (e.g., 25, 45), and a switching valve (e.g., 23, 43) for inputting, selectively switching and outputting said control pressure (e.g., $P_{CONTC1}$, $P_{CONTB1}$) and said line pressure ($P_L$) to said predetermined hydraulic servo (e.g., 25, 45), wherein the hydraulic control apparatus further comprises flow rate regulating element (e.g., 30, 50) for regulating the flow rate of an oil path (e.g., g, s) for inputting said line pressure ($P_L$) to said switching valve (e.g., 23, 43).

The second aspect of the invention (e.g., see FIGS. 1 and 3) resides in the hydraulic control apparatus of the automatic transmission according to the first aspect, wherein said flow rate regulating element is an orifice (e.g., 30, 50) arranged in the oil path (e.g., g, s) for inputting said line pressure ($P_L$) to said switching valve (e.g., 23, 43).

The third aspect of the invention (e.g., see FIGS. 1 and 3) resides in the hydraulic control apparatus of the automatic transmission according to the first to second aspects, wherein said control pressure output element is constructed by a solenoid valve (e.g., 21, 41) for outputting signal pressure (e.g., $P_{SLC1}$, $P_{SLB1}$) by adjusting the oil pressure, and a control valve (e.g., 22, 42) for outputting the control pressure (e.g., $P_{CONTC1}$, $P_{CONTB1}$) provided by adjusting the line pressure ($P_L$) on the basis of the signal pressure (e.g., $P_{SLC1}$, $P_{SLB1}$) of said solenoid valve (e.g., 21, 41).

The fourth aspect of the invention (e.g., see FIGS. 1 and 3) resides in the hydraulic control apparatus of the automatic transmission according to any one of the first to third aspects, wherein said switching valve (e.g., 23, 43) has a spool (e.g., 23p, 43p), a spring (e.g., 23s, 43s) for biasing the spool (e.g., 23p, 43p) in one direction, a first oil chamber (e.g., 23b, 43b) for inputting the oil pressure ($P_{MOD}$) associated with said line pressure ($P_L$) at one end of the spool (e.g., 23p, 43p), and a second oil chamber (e.g., 23a, 43a) for inputting said signal pressure (e.g., $P_{SLC1}$, $P_{SLB1}$) or said control pressure (e.g., $P_{CONTC1}$, $P_{CONTB1}$) at the other end of the spool (e.g., 23p, 43p), and said line pressure ($P_L$) is outputted to said predetermined hydraulic servo (e.g., 25, 45) on the basis of said spool (e.g., 23p, 43p) position when the biasing forces of biasing of said spring (e.g., 23s, 43s) and said signal pressure (e.g., $P_{SLC1}$, $P_{SLB1}$) or said control pressure (e.g., $P_{CONTC1}$, $P_{CONTB1}$) of said second oil chamber (e.g., 23a, 43a) are greater than the biasing force of the oil pressure ($P_{MOD}$) associated with said line pressure ($P_L$) of said first oil chamber (e.g., 23b, 43b).

The fifth aspect of the invention (e.g., see FIGS. 1 to 6) resides in the hydraulic control apparatus of the automatic transmission according to any one of the first to fourth aspects, wherein said automatic transmission is a multistage type transmission (10) having a plurality of frictional engaging elements (e.g., C-1, C-2, C-3, B-1, B-2) and performing a speed shifting operation by controlling the plurality of frictional engaging elements appropriately, and one of said plurality of frictional engaging elements is a first clutch (C-1) engaged at a comparatively low speed stage.

The sixth aspect of the invention resides in the hydraulic control apparatus of the automatic transmission according to any one of the first to fifth aspects, wherein said automatic transmission is a multistage type transmission (10) having a plurality of frictional engaging elements (e.g., C-1, C-2, C-3, B-1, B-2) and performing a speed shifting operation by controlling the plurality of frictional engaging elements appropriately, and one of said plurality of frictional engaging elements is a second clutch (C-3) engaged at a reverse stage.

The seventh aspect of the invention resides in the hydraulic control apparatus of the automatic transmission according to any one of the first to sixth aspects, wherein said automatic transmission is a multistage type transmission (10) having a plurality of frictional engaging elements (e.g., C-1, C-2, C-3, B-1, B-2) and performing a speed shifting operation by controlling the plurality of frictional engaging elements, and performing neutral control for setting one of the plurality of frictional engaging elements (C-1 or C-3) for transmitting power to be in a standby state just before the engagement at a neutral state, and said one of the plurality of frictional engaging elements is a first brake (B-1) engaged to perform hill hold control at said neutral state.

The eighth aspect of the invention resides in the hydraulic control apparatus of the automatic transmission according to the seventh aspect, wherein said first brake (B-1) is constructed by a band brake.

The above reference numerals within the above parentheses are described to be collated with the drawings. However, these reference numerals are conveniently described to easily understand the invention and have no influence on the construction of the claims.

Consistent with an exemplary embodiment of the present invention according to a first aspect, the flow rate regulating element for regulating the flow rate of the oil path for inputting the line pressure to the switching valve is arranged. Accordingly, even when the switching valve is operated in error, it is possible to prevent the oil from suddenly flowing into the predetermined hydraulic servo of the frictional engaging element and the speed change shock can be prevented while fuel cost of the vehicle can be improved and the automatic transmission can be made compact. Further, the excessive reduction of the line pressure can be prevented so that the erroneous operation of the switching valve in the engaging operation of another frictional engaging element can be prevented.

Consistent with an exemplary embodiment of the present invention according to a second aspect, the flow rate of the oil path can be regulated since the flow rate regulating element is the orifice arranged in the oil path for inputting the line pressure to the switching valve.

Consistent with an exemplary embodiment of the present invention according to a third aspect, the control pressure output element is constructed by the solenoid valve for outputting the signal pressure by adjusting the oil pressure, and the control valve for outputting the control pressure provided by adjusting the line pressure on the basis of the signal pressure of the solenoid valve. Accordingly, the control pressure provided by adjusting the line pressure can be outputted.

Consistent with an exemplary embodiment of the present invention according to a fourth aspect, the line pressure is outputted to the predetermined hydraulic servo on the basis of the spool position when the biasing forces of biasing of the spring and the signal pressure of the second oil chamber are greater than the biasing force of the oil pressure associated with the line pressure of the first oil chamber. Accordingly, when the line pressure is reduced, there is a possibility that the switching valve is operated in error. However, even when the switching valve is operated in error, it is possible to prevent the oil from being suddenly flowed into the predetermined hydraulic servo of the frictional engaging element and the speed change shock can be prevented.

Consistent with an exemplary embodiment of the present invention according to a fifth aspect, the frictional engaging element is the first clutch engaged at the comparatively low speed stage. Accordingly, there is a possibility that the switching valve is operated in error in switching from a neutral range to a running range and a coast state at the comparatively low vehicle speed. However, even when the switching valve is operated in error, it is possible to prevent the oil from being suddenly flowed into the predetermined hydraulic servo of the frictional engaging element and the speed change shock can be prevented.

Consistent with an exemplary embodiment of the present invention according to a sixth aspect, the frictional engaging element is the second clutch engaged at the reverse stage. Accordingly, there is a possibility that the switching valve is operated in error in switching from the neutral range to a reverse range. However, even when the switching valve is operated in error, it is possible to prevent the oil from suddenly flowing into the predetermined hydraulic servo of the frictional engaging element and the speed change shock can be prevented.

Consistent with an exemplary embodiment of the present invention according to a seventh aspect, the frictional engaging element is the first brake engaged to perform the hill hold control at the neutral state. Accordingly, it is possible to prevent the oil from suddenly flowing into the predetermined hydraulic servo of the first brake and a great reduction of the line pressure can be prevented. Thus, it is possible to prevent the erroneous operation of the switching valve relating to the frictional engaging element for particularly transmitting power during the neutral control. Further, the erroneous engagement of this frictional engaging element for transmitting power can be prevented during the neutral control.

Consistent with an exemplary embodiment of the present invention according to an eighth aspect, the first brake is constructed by a band brake. Accordingly, the volume of the operating oil chamber of the predetermined hydraulic servo is comparatively large and the line pressure is more greatly reduced when the oil is suddenly flowed-in. However, it is possible to prevent the oil from suddenly flowing into the predetermined hydraulic servo of the first brake so that the great reduction of the line pressure can be prevented.

BRIEF DESCRIPTION OF THE DRAWINGS

FIG. 5 is a time chart showing the neutral control time in an exemplary embodiment of the present invention.

FIGS. 6A and 6B are views showing an automatic transmission of an exemplary embodiment of the present invention in which FIG. 6A is a skeleton view and FIG. 6B is its engaging table.

DESCRIPTION OF THE EXEMPLARY EMBODIMENTS

Figures 6A, 6B:
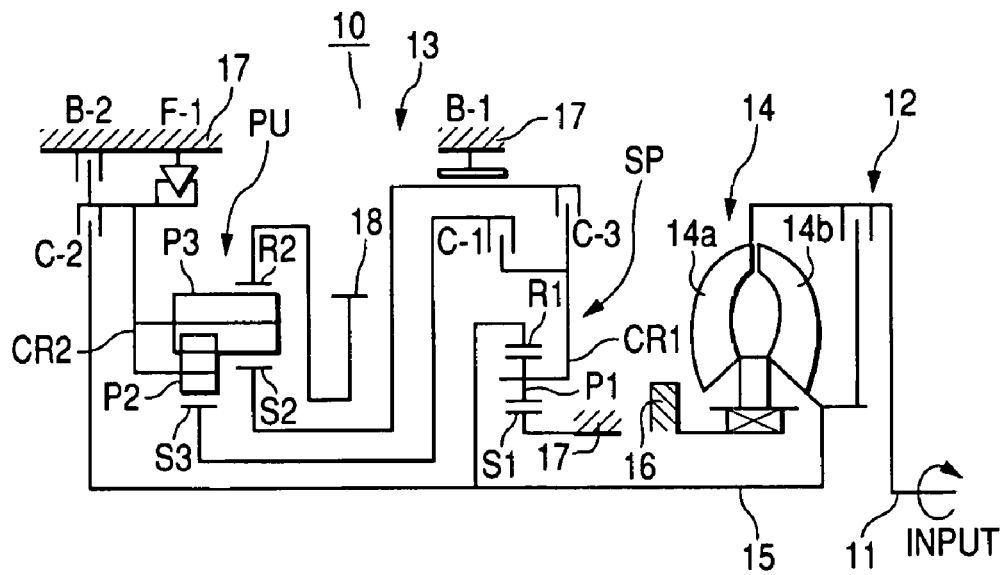
Figure 7:
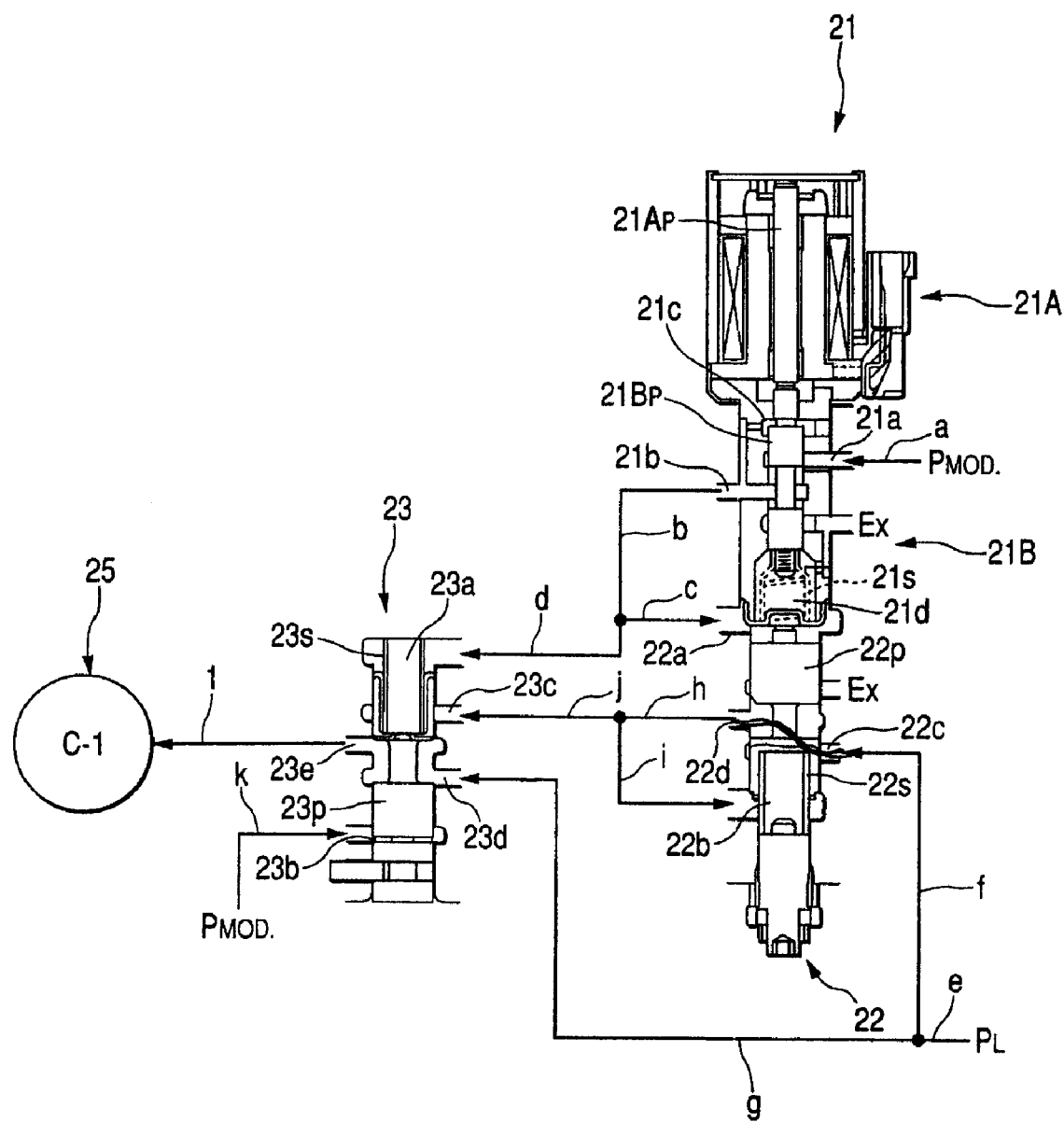
FIG. 7 is a schematic view showing a hydraulic circuit of the conventional hydraulic control apparatus.
Figure 8:
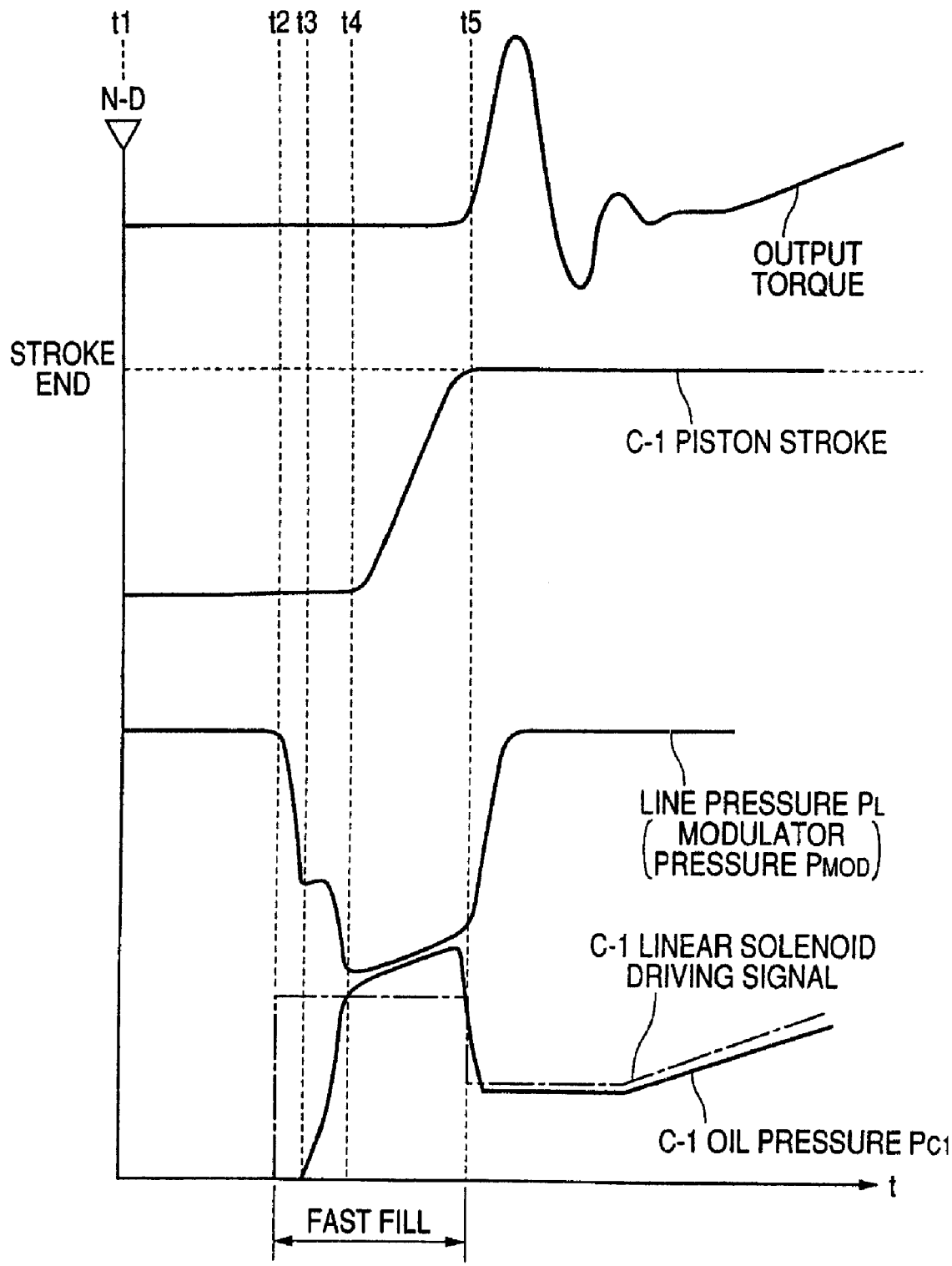
FIG. 8 is a time chart showing an experimental example at the N-D shift time using the conventional hydraulic control apparatus.

The exemplary embodiments of the present invention will next be explained along the drawings. One example of an automatic transmission able to apply the present invention thereto will first be explained along with FIGS. 6A and 6B. FIGS. 6A and 6B are views showing the automatic transmission 10 in which FIG. 6A is a skeleton view and FIG. 6B is its engaging table.

As shown in FIG. 6A, for example, the automatic transmission 10 is suitably used in a vehicle of an FF type (front engine, front drive) and has an input shaft 11 of the automatic transmission 10 able to be connected to an unillustrated engine. The automatic transmission 10 also has a torque converter 14 with the axial direction of the input shaft 11 as a center, and a speed change mechanism 13.

The above torque converter 14 has a pump impeller 14a connected to the input shaft 11 of the automatic transmission 10, and a turbine runner 14b to which rotation of the pump impeller 14a is transmitted through an operating fluid. The turbine runner 14b is connected to an input shaft 15 of the above speed change mechanism 13 arranged on the same axis as the above input shaft 11. A lock-up clutch 12 is arranged in the torque converter 14. When the lock-up clutch 12 is engaged by hydraulic control of an unillustrated hydraulic control apparatus, the rotation of the input shaft 11 of the above automatic transmission 10 is directly transmitted to the input shaft 15 of the speed change mechanism 13. Further, an oil pump 16 is connected to the above pump impeller 14a and is operated in a form associated with the rotation of the unillustrated engine.

In the above speed change mechanism 13, a planetary gear SP and a planetary gear unit PU are arranged on the input shaft 15. The planetary gear SP has a sun gear S1, a carrier CR1 and a ring gear R1 and is a so-called single pinion planetary gear in which the carrier CR1 has a pinion P1 mutually engaged with the sun gear S1 and the ring gear R1. Further, the planetary gear unit PU has a sun gear S2, a sun gear S3, a carrier CR2 and a ring gear R2, and is a so-called ravegneaux type planetary gear in which a short pinion P2 engaged with the sun gear S3 and a long pinion P3 engaged with the sun gear S2 and the ring gear R2 are arranged in a mutual engaging shape in the carrier CR2.

The sun gear S1 of the above planetary gear SP is integrally fixed to a mission case 17. Further, the above ring gear R1 is connected to the above input shaft 15 and is set to the same rotation (hereinafter called input rotation) as the rotation of the input shaft 12. Further, the carrier CR1 is set to deceleration rotation for decelerating the input rotation by the fixed sun gear S1 and the input-rotated ring gear R1 and is connected to a first clutch C-1 and a third clutch C-3.

The sun gear S2 of the above planetary gear unit PU is connected to the above third clutch C-3 so that the deceleration rotation of the above carrier CR1 is freely inputted. Further, the sun gear S2 is connected to a first brake B-1 constructed by a band brake and is freely fixed to the mission case 17. Further, the above sun gear S3 is connected to the first clutch C-1 so that the deceleration rotation of the above carrier CR1 is freely inputted.

Further, the above carrier CR2 is connected to a second clutch C-2 for inputting the rotation of the input shaft 15 thereto so that the input rotation is freely inputted. Further, the carrier CR2 is connected to a one-way clutch F-1 and a second brake B-2 so that rotation in one direction is regulated with respect to the mission case 17 through the one-way clutch F-1, and the rotation is freely fixed through the second brake B-2. The above ring gear R2 is connected to a counter gear 18 for outputting the rotation to an unillustrated drive wheel.

Next, the operation of the automatic transmission 10 will be explained along FIGS. 6A and 6B.

For example, as shown in FIG. 6B, the clutch C-1 and the one-way clutch F-1 are engaged at an advance-1 speed stage (1st) in a D (drive) range. Thus, as shown in FIG. 6A, the rotation of the carrier CR1 decelerated in rotation is inputted to the sun gear S3 through the clutch C-1 by the fixed sun gear S1 and the ring gear R1 as the input rotation. Further, the rotation of the carrier CR2 is regulated in one direction (positive rotating direction) by the one-way clutch F-1. Namely, reverse rotation of the carrier CR2 is prevented so that a fixed state is attained. Thus, the decelerated rotation inputted to the sun gear S3 is outputted to the ring gear R2 through the fixed carrier CR2, and the positive rotation as the advance-1 speed stage is outputted from the counter gear 18.

At an engine brake time (coast time), the carrier CR2 is fixed by engaging the brake B-2, and the state of the above advance-1 speed stage is maintained in a shape for preventing the positive rotation of the carrier CR2. Further, at the advance-1 speed stage, the reverse rotation of the carrier CR2 is prevented by the one-way clutch F-1 and the positive rotation can be performed. Accordingly, for example, the advance-1 speed stage in switching from a non-running range to a running range can be smoothly achieved by automatic engagement of the one-way clutch F-1.

At an advance-2 speed stage (2nd), the clutch C-1 is engaged and the brake B-1 is engaged as shown in FIG. 6B. Thus, as shown in FIG. 6A, the rotation of the carrier CR1 decelerated and rotated by the fixed sun gear S1 and the ring gear R1 as the input rotation is inputted to the sun gear S3 through the clutch C-1. Further, the rotation of the sun gear S2 is fixed by engaging the brake B-1. Thus, the carrier CR2 becomes deceleration rotation lower than the rotation of the sun gear S3. The deceleration rotation inputted to the sun gear S3 is outputted to the ring gear R2 through the carrier CR2 and the positive rotation as the advance-2 speed stage is outputted from the counter gear 18.

Here, neutral control in the D-range will be explained. For example, when the vehicle attains a stopping state in the D-range (vehicle speed=0), the hydraulic servo of the clutch C-1 is hydraulically controlled as shown in FIG. 6B, and a piston of the hydraulic servo is controlled to a state approximately just before the piston comes in contact with a frictional plate. Thus, the clutch C-1 attains a state just before the engagement. As shown in FIG. 6A, the power transmission between the input shaft 15 and the counter gear 18 is thus interrupted, and the automatic transmission 10 is controlled to a neutral state in which no power is transmitted. When the vehicle is stopped, the advance-1 speed stage or the advance-2 speed stage is normally selected. Accordingly, this neutral control is performed from the state of the advance-1 speed stage or the advance-2 speed stage mentioned above.

Further, in this case, as shown in FIG. 6B, the brake B-1 is engaged (no line pressure during the engagement is normally supplied to the hydraulic servo of the brake B-1, but the brake B-1 is engaged by low oil pressure using the control pressure). As shown in FIG. 6A, the rotation of the ring gear R2 is fixed by the engagement of the sun gear S2 using the brake B-1 and the engagement of the carrier CR2 using the one-way clutch F-1. Thus, for example, so-called hill hold control is performed so as not to retreat the vehicle in a slope path, etc.

Subsequently, at an advance-3 speed stage (3rd), the clutch C-1 and the clutch C-3 are engaged as shown in FIG. 6B. Thus, as shown in FIG. 6A, the rotation of the carrier CR1 is decelerated and rotated by the fixed sun gear S1 and the ring gear R1 as the input rotation is inputted to the sun gear S3 through the clutch C-1. Further, the deceleration rotation of the carrier CR1 is inputted to the sun gear S2 by engaging the clutch C-3. Namely, since the deceleration rotation of the carrier CR1 is inputted to the sun gear S2 and the sun gear S3, the planetary gear unit PU attains a direct connecting state of the deceleration rotation and the deceleration rotation is outputted to the ring gear R2 as it is. The positive rotation as the advance-3 speed stage is outputted from the counter gear 18.

At an advance-4 speed stage (4th), the clutch C-1 and the clutch C-2 are engaged as shown in FIG. 6B. Thus, as shown in FIG. 6A, the rotation of the carrier CR1 decelerated and rotated by the fixed sun gear S1 and the ring gear R1 as the input rotation is inputted to the sun gear S3 through the clutch C-1. Further, the input rotation is inputted to the carrier CR2 by engaging the clutch C-2. Thus, the deceleration rotation higher than that at the above advance-3 speed stage is attained by the deceleration rotation inputted to the sun gear S3 and the input rotation inputted to the carrier CR2 and is outputted to the ring gear R2 and the positive rotation as the advance-4 speed stage is outputted from the counter gear 18.

At an advance-5 speed stage (5th), the clutch C-2 and the clutch C-3 are engaged as shown in FIG. 6B. Thus, as shown in FIG. 6A, the rotation of the carrier CR1 decelerated and rotated by the fixed sun gear S1 and the ring gear R1 as the input rotation is inputted to the sun gear S2 through the clutch C-3. Further, the input rotation is inputted to the carrier CR2 by engaging the clutch C-2. Thus, speed increasing rotation slightly higher than the input rotation is attained by the deceleration rotation inputted to the sun gear S2 and the input rotation inputted to the carrier CR2 and is outputted to the ring gear R2, and the positive rotation as the advance-5 speed stage is outputted from the counter gear 18.

At an advance-6 speed stage (6th), the clutch C-2 is engaged and the brake B-1 is engaged as shown in FIG. 6B. Thus, as shown in FIG. 6A, the input rotation is inputted to the carrier CR2 by engaging the clutch C-2. Further, the rotation of the sun gear S2 is fixed by engaging the brake B-1. Thus, the input rotation of the carrier CR2 becomes speed increasing rotation higher than that at the above advance-5 speed stage by the fixed sun gear S2 and is outputted to the ring gear R2, and the positive rotation as the advance-6 speed stage is outputted from the counter gear 18.

Further, for example, the clutch C-3 is engaged and the brake B-2 is engaged as shown in FIG. 6B at a retreat-1 speed stage ($V \leq 7$, vehicle speed 7 km/h or less) in a R (reverse) range. Thus, as shown in FIG. 6A, the rotation of the carrier CR1 decelerated and rotated by the fixed sun gear S1 and the ring gear R1 as the input rotation is inputted to the sun gear S2 through the clutch C-3. Further, the rotation of the carrier CR2 is fixed by engaging the brake B-2. Thus, the deceleration rotation inputted to the sun gear S2 is outputted to the ring gear R2 through the fixed carrier CR2 and the reverse rotation as the retreat-1 speed stage is outputted from the counter gear 18.

When the vehicle speed becomes 7 km/h or more (V>7) at the retreat-1 speed stage, the clutch C-3 is released as shown in FIG. 6B and the power transmission between the input shaft 15 and the counter gear 18 is interrupted as shown in FIG. 6A. Thus, the automatic transmission 10 attains the neutral state for transmitting no power, and is controlled so as not to perform the acceleration in the reverse direction.

Here, the neutral control in the R-range will be explained. For example, when the vehicle attains the stopping state in the R-range (vehicle speed=0), the hydraulic servo of the clutch C-3 is hydraulically controlled as shown in FIG. 6B and the piston of the hydraulic servo is controlled to a state approximately just before the piston comes in contact with the frictional plate. Thus, the clutch C-3 attains a state just before the engagement and the power transmission between the input shaft 15 and the counter gear 18 is interrupted as shown in FIG. 6A. Thus, the automatic transmission 10 is controlled to the neutral state in which no power is transmitted.

Further, in this case, as shown in FIG. 6B, the brake B-2 is engaged and the brake B-1 is engaged (no line pressure during the engagement is normally supplied to the hydraulic servo of the brake B-1, but the brake B-1 is engaged by low oil pressure using the control pressure). As shown in FIG. 6A, the rotation of the ring gear R2 is fixed by the engagement of the sun gear S2 using the brake B-1 and the engagement of the carrier CR2 using the brake B-2. Thus, for example, the so-called hill hold control is performed so as not to advance the vehicle in a slope path, etc.

Further, for example, in a P (parking) range and the N (neutral) range, the clutch C-1, the clutch C-2 and the clutch C-3 are released as shown in FIG. 6B. Thus, as shown in FIG. 6A, the power transmission between the input shaft 15 and the counter gear 18 is interrupted and the automatic transmission 10 attains the state for transmitting no power.

Figure 1:
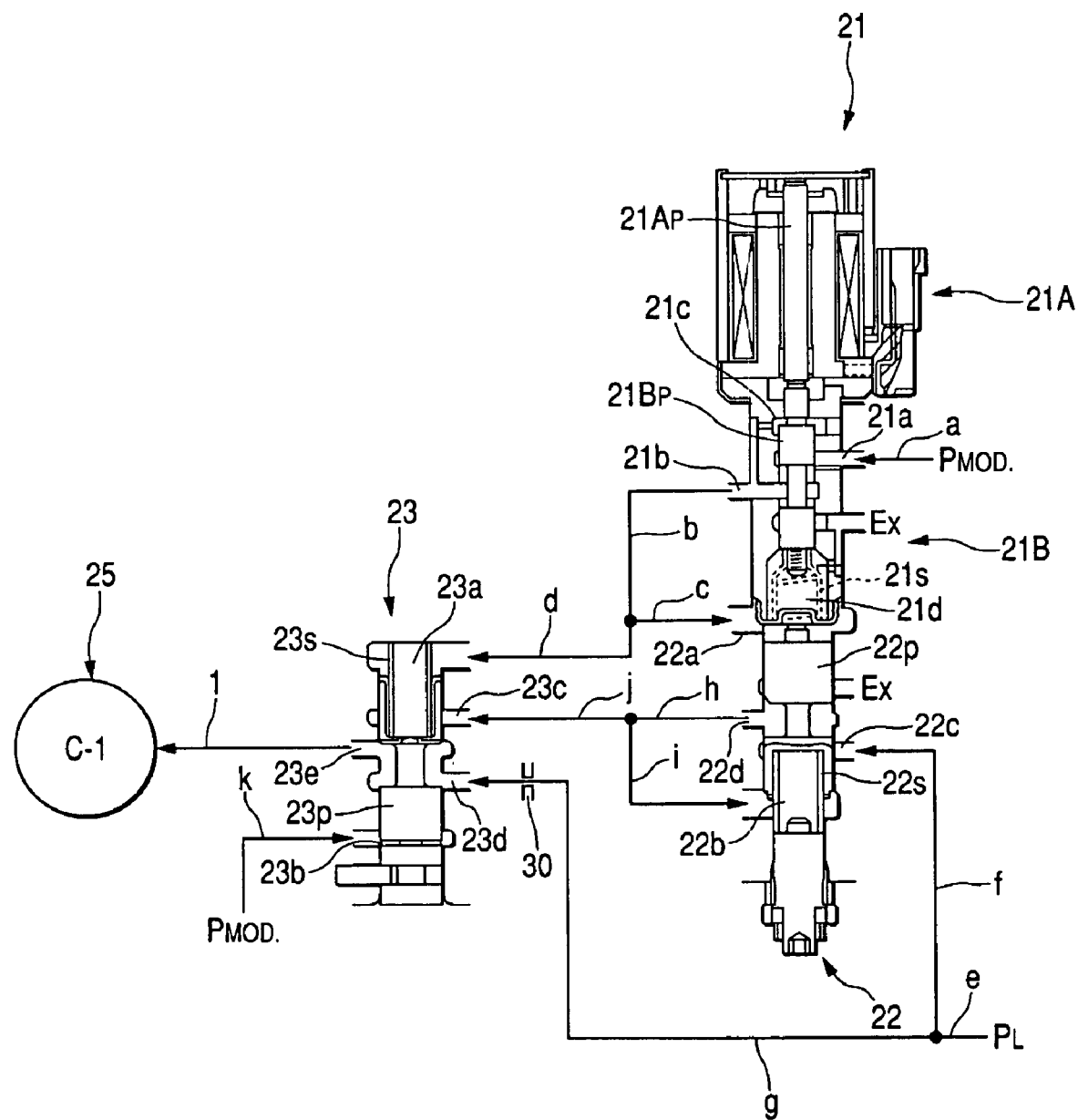
FIG. 1 is a schematic view showing a hydraulic circuit of a clutch C-1 in an exemplary embodiment of the present invention.
Figure 2:
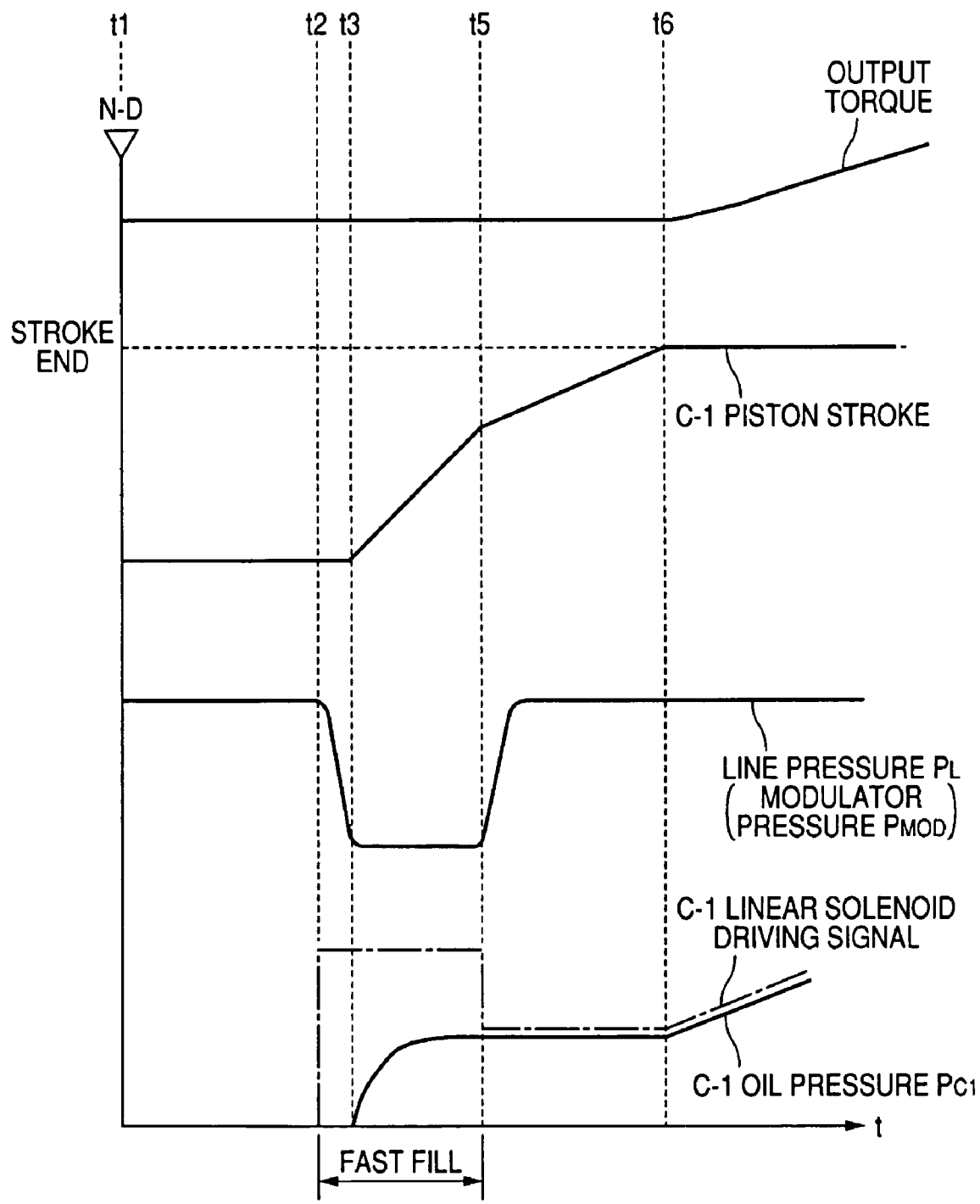
FIG. 2 is a time chart showing an N-D shift time in an exemplary embodiment of the present invention.
Figure 3:
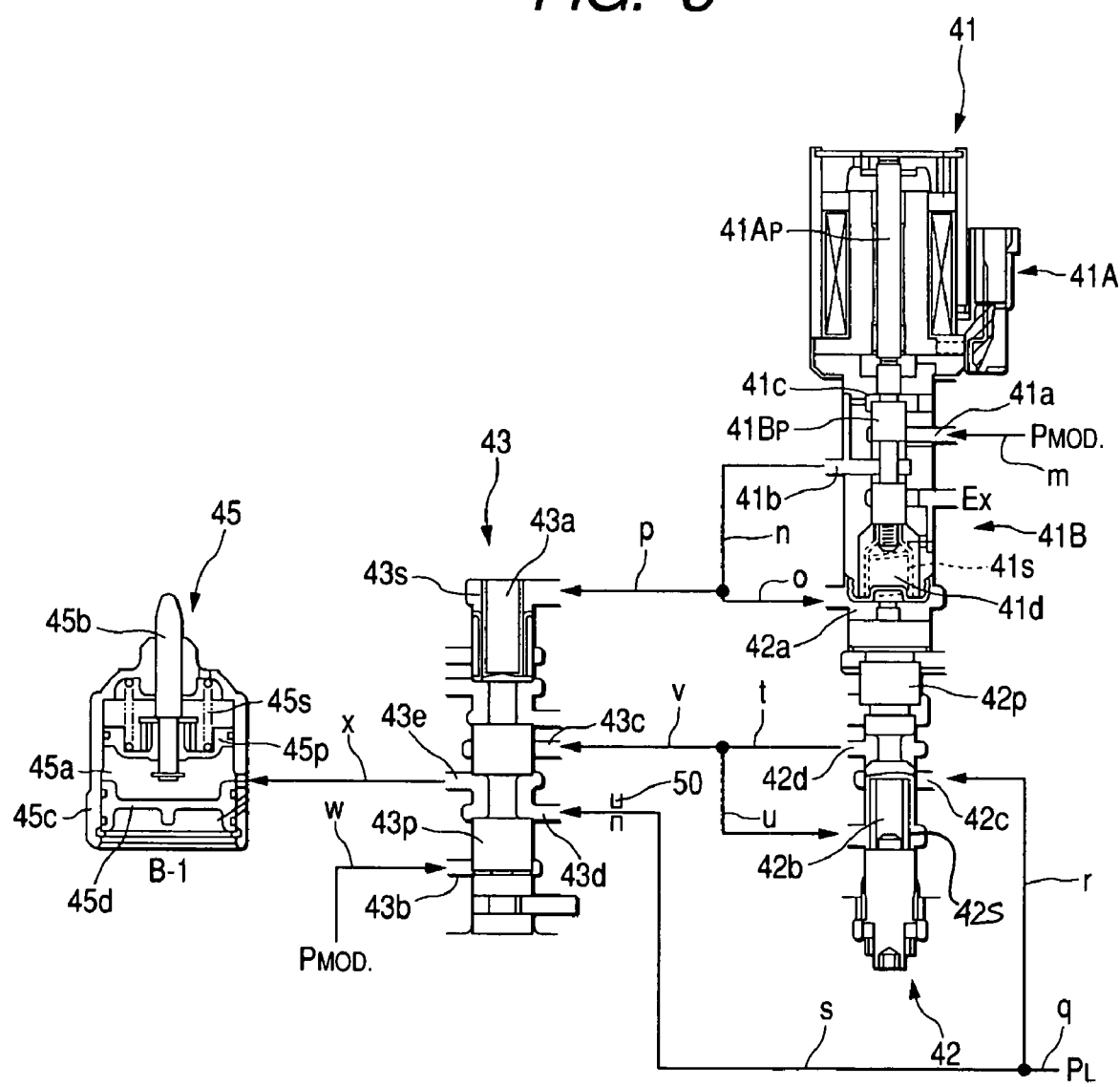
FIG. 3 is a schematic view showing a hydraulic circuit of a brake B-1 in an exemplary embodiment of the present invention.
Figure 4:
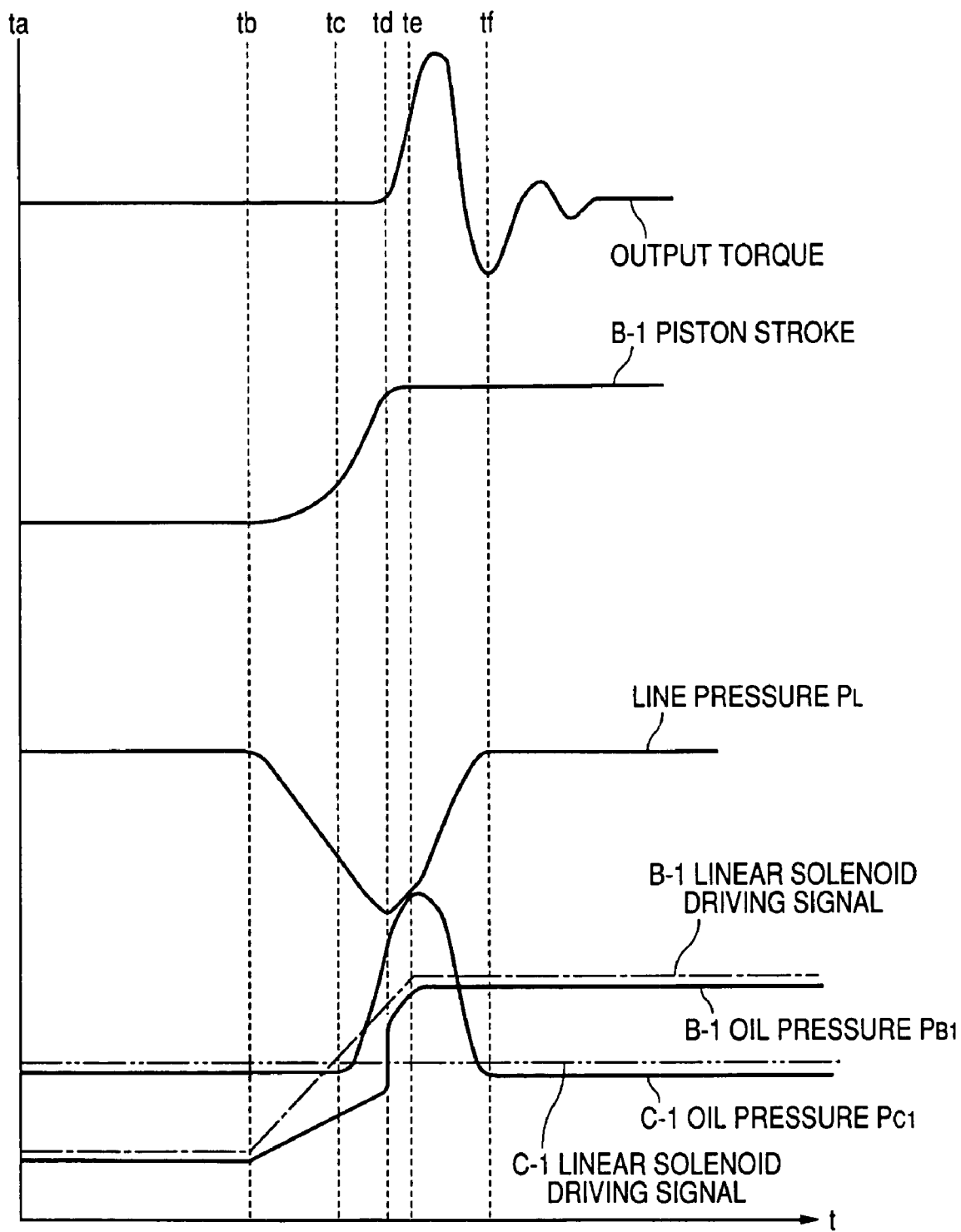
FIG. 4 is a time chart showing an experimental example at a neutral control time using a conventional hydraulic control apparatus.

Next, the hydraulic control apparatus of the automatic transmission in an exemplary embodiment of the present invention will be explained along the drawings. FIG. 1 is a schematic view showing a hydraulic circuit of the clutch C-1 consistent with an exemplary embodiment of the present invention. FIG. 2 is a time chart showing an N-D shift time consistent with an exemplary embodiment the present invention. FIG. 3 is a schematic view showing a hydraulic circuit of the brake B-1 consistent with an exemplary embodiment of the present invention. FIG. 4 is a time chart showing an experimental example at a neutral control time using a conventional hydraulic control apparatus. FIG. 5 is a time chart showing the neutral control time consistent with an exemplary embodiment of the present invention.

Only portions relating to the hydraulic supply of the clutch C-1 or the brake B-1 are shown in the hydraulic circuits shown in FIGS. 1 and 3. The hydraulic control apparatus of the automatic transmission originally functions by additionally arranging plural valves, oil paths, etc. However, these figures and explanations are omitted here to easily understand the present invention and only portions relating to the present invention will next be explained.

As shown in FIG. 1, in the hydraulic control apparatus of the automatic transmission, a linear solenoid valve (control pressure output element) 21 for C-1, a control valve 22, a C-1 apply relay valve (switching valve) 23 and a C-1 hydraulic servo 25 are arranged in the hydraulic circuit of the clutch C-1. This hydraulic circuit is constructed by connecting these members by plural oil paths a to l described later in detail.

On the other hand, a primary regulator valve for adjusting and outputting the oil pressure generated by the above oil pump 16 as line pressure $P_L$, and a modulator valve for adjusting the line pressure $P_L$ so as not to become a predetermined pressure or more and outputting this line pressure $P_L$ as modulator pressure $P_{MOD}$ are arranged in portions in which the illustration of the hydraulic control apparatus of the automatic transmission is omitted. This modulator pressure $P_{MOD}$ becomes about the same oil pressure as the line pressure $P_L$ as long as this modulator pressure $P_{MOD}$ does not become a predetermined pressure or more. Namely, the modulator pressure $P_{MOD}$ is oil pressure in a shape associated with the line pressure $P_L$.

The above linear solenoid valve 21 for C-1 is constructed by arranging a linear driving portion 21A having a spool 21Ap operated and controlled on the basis of a signal output from an unillustrated electronic controller, etc., and a valve portion 21B having a spool 21Bp operated by the spool 21Ap. The spool 21Bp of the valve 21B is biased in the upward direction in FIG. 1 by a spring 21s. When the spool 21Ap of the linear driving portion 21A is moved in the lower direction by electronic control, the spool 21Bp is moved in the lower direction against the biasing of the spring 21s. The valve 21B has a port 21a, a port 21b and a drain port EX. The above modulator pressure $P_{MOD}$ is inputted to the port 21a through the oil path a.

The linear solenoid valve 21 for C-1 is normally opened. When no linear solenoid valve 21 for C-1 is operated, the port 21a and the port 21b are communicated with each other and the modulator pressure $P_{MOD}$ is outputted to the oil path b as signal pressure $P_{SLC1}$. Further, when the linear driving portion 21A of the linear solenoid valve 21 for C-1 is operated by the electronic control and the spool 21Ap is moved and operated in a shape for adjusting the moving amount in the lower direction, the spool 21Bp of the valve portion 21B is moved and operated in the lower direction against the biasing of the spring 21s, and the signal pressure $P_{SLC1}$ is adjusted in a shape in which the port 21a and the drain port EX are gradually communicated with each other. Namely, when the spool 21Bp is located in the lowermost position, the signal pressure $P_{SLC1}$ outputted from the port 21b to the oil path b becomes zero.

An oil chamber 21c communicated with the port 21b and inputting feedback oil pressure of the signal pressure $P_{SLC1}$, and an oil chamber 21d communicated with the drain port EX and inputting feedback oil pressure of the drained oil pressure are respectively arranged in the valve portion 21B.

The control valve 22 is arranged on the downward side of the above linear solenoid valve 21 for C-1. The control valve 22 is constructed by arranging a spool 22p, a spring 22s for biasing the spool 22p on the upward side, an oil chamber 22a at the upper end of the spool 22p, an oil chamber 22b at the lower end of the spool 22p, a port 22c and a port 22d.

The above signal pressure $P_{SLC1}$ is inputted to the above oil chamber 22a through oil paths b, c and the above spool 22p is moved and operated on the downward side against the biasing of the spring 22s by the signal pressure $P_{SLC1}$. Further, the above line pressure $P_L$ is inputted to the port 22c through a port for the D-range of an unillustrated manual shift valve, oil paths e, f, etc. When the spool 22p is moved and operated on the downward side on the basis of the above signal pressure $P_{SLC1}$, the port 22c and the port 22d are gradually communicated with each other and control pressure $P_{CONTC1}$ controlled by the signal pressure $P_{SLC1}$ is outputted to an oil path h by the port 22d. The feed back oil pressure of the control pressure $P_{CONTC1}$ outputted from the oil path h is inputted to the oil chamber 22b through an oil path i.

The C-1 apply relay valve 23 is constructed by arranging a spool 23p, a spring 23s for biasing this spool 23 on the downward side, an oil chamber 23a at the upper end (other end) of the spool 23p, an oil chamber 23b at the lower end (one end) of the spool 23p, a port 23c, a port 23d and a port 23e.

The above signal pressure $P_{SLC1}$ is inputted to the above oil chamber 23a through oil paths b, d, and the above modulator pressure $P_{MOD}$ is inputted to the above oil chamber 23b through an oil path k. The above spool 23p is located in the lower position by the biasing force of the spring 23s when the modulator pressure $P_{MOD}$ is inputted to the oil chamber 23a from the linear solenoid valve 21 for C-1 not operated as mentioned above and the modulator pressure $P_{MOD}$ is inputted to the oil chamber 23b. When the linear solenoid valve 21 for C-1 is operated as mentioned above and the signal pressure $P_{SLC1}$ is reduced until a predetermined pressure or less, the spool 23p is switched to the upper position since the modulator pressure $P_{MOD}$ of the oil chamber 23b becomes stronger than the signal pressure $P_{SLC1}$ of the oil chamber 23a and the biasing force of the spring 23s.

When the spool 23p is located in the lower position, the port 23d and the port 23e are communicated with each other and the line pressure $P_L$ inputted through an oil path g is outputted to the oil path 1 from the port 23e. In contrast to this, when the spool 23p is located in the upper position, the port 23c and the port 23e are communicated with each other and the above control pressure $P_{CONTC1}$ inputted through oil paths h, j is outputted from the port 23e to the oil path 1. Namely, the line pressure $P_L$ and the control pressure $P_{CONTC1}$ are selectively switched and inputted to the operating oil chamber of the C-1 hydraulic servo 25 by switching the C-1 apply relay valve 23.

In the hydraulic control apparatus of the automatic transmission in an exemplary embodiment of the present invention, an orifice 30 for regulating the flow rate of the oil passing through the oil path g is arranged in the oil path g for inputting the line pressure $P_L$ to the port 23d of the C-1 apply relay valve 23.

Subsequently, the operation of the hydraulic control apparatus of this automatic transmission at the N-D shift time will be explained along FIGS. 1 and 2. For example, when an unillustrated shift lever is selected in the N-range by a driver, the clutches C-1, C-2, C-3 of the automatic transmission 10 are set to a release state as mentioned above (see FIGS. 6A and 6B). Further, in this case, the line pressure $P_L$ is drained by an unillustrated manual shift valve and the line pressure $P_L$ inputted to the oil path e is zero, and the modulator pressure $P_{MOD}$ inputted to oil paths a, k is also zero.

Here, as shown in FIG. 2, for example, when the unillustrated shift lever is shifted from the N-range to the D-range at a time point t1, the line pressure $P_L$ is supplied from a port for the D-range of the unillustrated manual shift valve and the line pressure $P_L$ begins to be supplied to the oil path e and the modulator pressure $P_{MOD}$ begins to be supplied to the oil paths a, k as shown in FIG. 1.

Next, at a time point t2, the linear solenoid valve 21 for C-1 is operated on the basis of a C-1 linear solenoid driving signal shown in FIG. 2. At this time, since the C-1 apply relay valve 23 is located in the upper position, the line pressure $P_L$ of the port 23d is interrupted and it is intended that the control pressure $P_{CONTC1}$ from the port 23c begins to be supplied to the C-1 hydraulic servo 25 through the port 23e and the oil path 1. However, in this case, the modulator pressure $P_{MOD}$ is drained in the valve portion 21B of the linear solenoid valve 21 for C-1 so that the line pressure $P_L$ begins to be reduced.

Thus, the modulator pressure $P_{MOD}$ is reduced until a time point t3 so that the biasing force of the spring 23s of the C-1 apply relay valve 23 becomes stronger than the modulator pressure $P_{MOD}$. Thus, the spool 23p is operated and moved to the lower position in error and the line pressure $P_L$ is supplied to the C-1 hydraulic servo 25 and C-1 oil pressure $P_{C1}$ begins to be raised. However, since the flow rate of the oil of the oil path g is regulated by the orifice 30 arranged in the oil path g, the movement (C-1 piston stroke) of the piston of the C-1 hydraulic servo is slowly made without suddenly flowing the oil into the C-1 hydraulic servo 25. Thus, no piston reaches the stroke end of the piston and namely comes in contact with the frictional plate. Accordingly, no clutch C-1 is engaged in the back-lash filling operation (fast fill) and no change is caused in the output torque.

Thereafter, when the C-1 linear solenoid driving signal falls and the drain amount of the linear solenoid valve 21 for C-1 is reduced at a time point t5, the line pressure $P_L$ is raised and the modulator pressure $P_{MOD}$ is also raised and the C-1 apply relay valve 23 is returned to the normal upper position. Thus, the control pressure $P_{CONTC1}$ based on the signal pressure $P_{SLC1}$ of the linear solenoid valve 21 for C-1 is supplied to the C-1 hydraulic servo 25 as usual. Then, the clutch C-1 is engaged and the output torque is gradually raised after a time point t6.

In the exemplary embodiment explained above, the hydraulic circuit of the clutch C-1 engaged at a relatively low speed stage such as the advance-1 speed stage, the advance-2 speed stage, etc. has been explained. However, similar operation effects can be also obtained at the N-R shift time by arranging an orifice in an oil path for inputting the line pressure $P_L$ to a C-3 apply relay valve in the hydraulic circuit of the clutch C-3 similarly engaged at the retreat-1 speed stage.

Subsequently, a case using an exemplary embodiment of the present invention in the hydraulic circuit relating to the brake B-1 will be explained. As shown in FIG. 3, in the hydraulic control apparatus of the automatic transmission, approximately similar to the hydraulic circuit of the above clutch C-1, a linear solenoid valve (control pressure output element) 41 for B-1, a control valve 42, a B-1 apply relay valve (switching valve) 43 and a B-1 hydraulic servo 45 are arranged in the hydraulic circuit of the brake B-1 as a band brake. The hydraulic control apparatus is constructed by connecting these members by plural oil paths m to x described later in detail.

The above linear solenoid valve 41 for B-1 is constructed by arranging a linear driving portion 41A having a spool 41Ap operated and controlled on the basis of a signal output from an unillustrated electronic controller, etc., and a valve portion 41B having a spool 41Bp operated by the spool 41Ap. The spool 41Bp of the valve 41B is biased by a spring 41s in the upper direction in FIG. 3. When the spool 41Ap of the linear driving portion 41A is moved in the lower direction by electronic control, the spool 41Bp is moved in the lower direction against the biasing of the spring 41s. The valve 41B has a port 41a, a port 41b and a drain port EX. The above modulator pressure $P_{MOD}$ is inputted to the port 41a through an oil path m.

The linear solenoid valve 41 for B-1 is normally opened. When no linear solenoid valve 41 for B-1 is operated, the port 41a and the port 41b are communicated with each other and the modulator pressure $P_{MOD}$ is outputted to an oil path n as signal pressure $P_{SLB1}$. Further, when the linear driving portion 41A of the linear solenoid valve 41 for B-1 is operated by electronic control and the spool 41Ap is moved and operated in a shape for adjusting the moving amount in the lower direction, the spool 41Bp of the valve portion 41B is moved and operated against the biasing of the spring 41s in the lower direction, and signal pressure $P_{SLB1}$ is adjusted in a shape in which the port 41a and the drain port EX are gradually communicated with each other. Namely, when the spool 41Bp is located in the lowermost position, the signal pressure $P_{SLB1}$ outputted from the port 41b to the oil path n becomes zero.

An oil chamber 41c communicated with the port 41b and inputting the feedback oil pressure of the signal pressure $P_{SLB1}$, and an oil chamber 41d communicated with the drain port EX and inputting the feedback oil pressure of the drained oil pressure are respectively arranged in the valve portion 41B.

The control valve 42 is arranged on the downward side of the above linear solenoid valve 41 for B-1. The control valve 42 is constructed by arranging a spool 42p, a spring 42s for biasing the spool 42p on the upward side, an oil chamber 42a at the upper end of the spool 42p, an oil chamber 42b at the lower end of the spool 42p, a port 42c and a port 42d.

The above signal pressure $P_{SLB1}$ is inputted to the above oil chamber 42a through oil paths n, o. The above spool 42p is moved and operated by the signal pressure $P_{SLB1}$ on the downward side against the biasing of the spring 42s. Further, the above line pressure $P_L$ is inputted to the port 42c through a port for the D-range of an unillustrated manual shift valve, oil paths q, r, etc. When the spool 42p is moved and operated on the downward side on the basis of the above signal pressure $P_{SLB1}$, the port 42c and the port 42d are gradually communicated with each other and control pressure $P_{CONTB1}$ controlled by the signal pressure $P_{SLB1}$ is outputted from the port 42d to an oil path h. The feedback oil pressure of the control pressure $P_{CONTB1}$ outputted from an oil path t is inputted to the oil chamber 42b through an oil path u.

The B-1 apply relay valve 43 is constructed by arranging a spool 43p, a spring 43s for biasing this spool 43 on the downward side, an oil chamber 43a at the upper end (other end) of the spool 43p, an oil chamber 43b at the lower end (one end) of the spool 43p, a port 43c, a port 43d and a port 43e.

The above signal pressure $P_{SLB1}$ is inputted to the above oil chamber 43a through oil paths n, p. Further, the above modulator pressure $P_{MOD}$ is inputted to the above oil chamber 43b through an oil path w. The above spool 43p is located in the lower position by the biasing force of the spring 43s when the modulator pressure $P_{MOD}$ is inputted to the oil chamber 43a from the linear solenoid valve 41 for B-1 not operated as mentioned above and the modulator pressure $P_{MOD}$ is inputted to the oil chamber 43b. Further, when the linear solenoid valve 41 for B-1 is operated as mentioned above and the signal pressure $P_{SLB1}$ is reduced until a predetermined pressure or less, the spool 43p is switched to the upper position since the modulator pressure $P_{MOD}$ of the oil chamber 43b becomes stronger than the signal pressure $P_{SLB1}$ of the oil chamber 43a and the biasing force of the spring 43s.

When the spool 43p is located in the lower position, the port 43d and the port 43e are communicated with each other and the line pressure $P_L$ inputted through an oil path s is outputted from the port 43e to an oil path x. In contrast to this, when the spool 43p is located in the upper position, the port 43c and the port 43e are communicated with each other and the above control pressure $P_{CONTB1}$ inputted through oil paths t, v is outputted from the port 43e to the oil path x. Namely, the line pressure $P_L$ and the control pressure $P_{CONTB1}$ are selectively switched and inputted to an operating oil chamber 45a of the B-1 hydraulic servo 45 described later in detail by switching the B-1 apply relay valve 43.

The B-1 hydraulic servo 45 is constructed by arranging a case 45c, a piston member 45p, a belt tightening member 45b connected to the piston 45p and an unillustrated brake band, a return spring 45s, a seal member 45d, and the operating oil chamber 45a. The operating oil chamber 45a is formed by the case 45c, the piston member 45p and the seal member 45d. When the oil pressure is supplied to the above operating oil chamber 45a, the piston member 45p and the belt tightening member are pressed on the upward side and the unillustrated brake band fastens e.g., a clutch drum of the clutch C-3, etc. and fixes the rotation of the sun gear S2 (see FIGS. 6A and 6B).

Since the hydraulic servo 45 of this brake B-1 is a band brake, a comparatively large piston stroke is required in comparison with the operating oil chamber of the hydraulic servo of a multi-plate type clutch and the brake. Therefore, the volume of the operating oil chamber 45a in the operating case of the hydraulic servo 45 is large and the supplied oil amount becomes comparatively large.

In the hydraulic control apparatus of the automatic transmission in the exemplary embodiment of the present invention, an orifice 50 for regulating the flow rate of the oil passing through the oil path s is arranged in the oil path s for inputting the line pressure $P_L$ to the port 43d of the B-1 apply relay valve 43.

Subsequently, the operation of the hydraulic control apparatus of the automatic transmission at the neutral control time will be explained along FIGS. 1, 3, 4 and 5. For example, when the vehicle is stopped while the shift lever is set to the D-range, the neutral control is started by commands of an unillustrated arithmetic control section. Thus, the above linear solenoid valve 21 for C-1 is operated and controlled and control pressure $P_{CONTC1}$ is controlled to first set the engaging state of the clutch C-1 to a state just before the engagement so that the oil pressure of the operating oil chamber of the C-1 hydraulic servo 25 is reduced until a predetermined pressure. The operation of the piston of the C-1 hydraulic servo 25 is controlled such that this piston is located in a position just before the piston comes in contact with the frictional plate of the clutch C-1, i.e., the piston stroke is located in a position just before the stroke end.

Here, for example, an experimental example will be explained along FIG. 4 when oil temperature is high and the engine rotation number is low and the discharge amount of the oil pump is small (i.e., when no idling rotation number is raised) and no orifice 50 of the oil path s shown in FIG. 3 is arranged. As shown in FIG. 4, for example, when the neutral control is started until a time point ta and the clutch C-1 is controlled to a state just before the engagement, the hill hold control is started at a time point tb so as not to retreat the vehicle in e.g., a slope path, etc.

Thus, the linear solenoid valve 41 for B-1 is operated on the basis of the B-1 linear solenoid driving signal shown in FIG. 4. At this time, since the B-1 apply relay valve 43 is located in the upper position, the line pressure $P_L$ of the port 43$d$ is interrupted and it is intended that the control pressure $P_{CONTB1}$ from the port 43$c$ begins to be supplied to the B-1 hydraulic servo 45 through the port 43$e$ and the oil path l. However, in this case, the modulator pressure $P_{MOD}$ is drained in the valve portion 41B of the linear solenoid valve 41 for B-1 so that the line pressure $P_L$ begins to be reduced.

Therefore, since the modulator pressure $P_{MOD}$ is reduced until a time point tc, the biasing force of the spring 43$s$ of the B-1 apply relay valve 43 becomes stronger than the modulator pressure $P_{MOD}$ and the spool 43$p$ is moved to the lower position in error. Therefore, the line pressure $P_L$ is supplied to the operating oil chamber 45$a$ of the B-1 hydraulic servo 45 and B-1 oil pressure $P_{B1}$ begins to be raised. Here, since there is no orifice 50 in the oil path s shown in FIG. 3, the oil is further suddenly flowed into the operating oil chamber 45$a$ of the B-1 hydraulic servo 45 so that the line pressure $P_L$ is reduced.

Thus, the modulator pressure $P_{MOD}$ is greatly reduced at the time point tc and the modulator pressure $P_{MOD}$ of the oil chamber 23$b$ becomes lower than the biasing force of the spring 23$s$ of the C-1 apply relay valve 23 shown in FIG. 1 and the signal pressure $P_{SLC1}$ of the oil chamber 23$a$ so that the C-1 apply relay valve 23 is moved to the lower position in error. Thus, the line pressure $P_L$ is flowed into the C-1 hydraulic servo 25 through the C-1 apply relay valve 23 and C-1 oil pressure $P_{C1}$ is raised. Since the clutch C-1 is being neutrally controlled and is in a state just before the engagement, the C-1 oil pressure $P_{C1}$ is raised so that the engagement is immediately started. Namely, the output torque is transmitted to a drive wheel although the neutral control is being performed.

Thereafter, when the supply of the oil to the operating oil chamber 45$a$ of the B-1 hydraulic servo 45 is terminated until a time point td (i.e., when the B-1 piston stroke becomes the stroke end), no oil is flowed into the operating oil chamber 45$a$. Therefore, the line pressure $P_L$ is raised in a restoring shape and the C-1 apply relay valve 23 is also returned to the normal upper position at a time point te. Thus, the C-1 oil pressure $P_{C1}$ is also returned to the control pressure $P_{CONTC1}$ during the neutral control until a time point tf. However, the clutch C-1 is suddenly released and the output torque is greatly changed. The engaging shock is caused as mentioned above.

Subsequently, a case in which the orifice is arranged in the hydraulic control apparatus of the automatic transmission in the exemplary embodiment of the present invention, i.e., in the above oil path s will be explained along FIG. 5. Similar to the above case, for example, when the neutral control is started until a time point ta as shown in FIG. 5 and the clutch C-1 is controlled to the state just before the engagement, the hill hold control is started so as not to retreat the vehicle in e.g., a slope path, etc. at a time point tb.

Thus, the linear solenoid valve 41 for B-1 is operated on the basis of the B-1 linear solenoid driving signal shown in FIG. 4. At this time, since the B-1 apply relay valve 43 is located in the upper position, the line pressure $P_L$ of the port 43$d$ is interrupted and it is intended that the control pressure $P_{CONTB1}$ from the port 43$c$ begins to be supplied to the B-1 hydraulic servo 45 through the port 43$e$ and the oil path l. However, in this case, the modulator pressure $P_{MOD}$ is drained in the valve portion 41B of the linear solenoid valve 41 for B-1 so that the line pressure $P_L$ begins to be reduced.

However, when the B-1 apply relay valve is switched to the line pressure supply side in advance and a control command for supplying the oil via the orifice is given, it is possible to regulate the flow rate of the oil of the oil path s by the orifice 50 arranged in the oil path s and constantly supply the oil with respect to time. Therefore, no oil is suddenly flowed into the operating oil chamber 45$a$ of the B-1 hydraulic servo 45 so that the movement (B-1 piston stroke) of the piston of the B-1 hydraulic servo is slowly made. Thus, no line pressure $P_L$ is greatly reduced and no modulator pressure $P_{MOD}$ is also greatly reduced. Accordingly, there is no case in which the modulator pressure $P_{MOD}$ of the oil chamber 23$b$ is lower than the biasing force of the spring 23$s$ of the C-1 apply relay valve 23 shown in FIG. 1 and the signal pressure $P_{SLC1}$ of the oil chamber 23$a$. Namely, no C-1 apply relay valve 23 is moved to the lower position in error and the C-1 oil pressure $P_{C1}$ is maintained as it is.

Thereafter, the B-1 piston stroke reaches the stroke end until a time point td. Namely, the brake B-1 is engaged and the hill hold control is normally started as mentioned above.

In the above explanation, the orifice 50 is arranged in the hydraulic circuit of the brake B-1 and the neutral control time is set. However, for example, when the speed is changed from the advance-3 speed stage to the advance-2 speed stage in e.g., a coast (engine brake) state, etc., it is also possible to prevent a reduction in line pressure $P_L$ and the B-1 apply relay valve of the clutch B-1 is operated in error in engaging the brake B-1. The present invention is also not limited to this case. The orifice may be arranged in the oil path for inputting the line pressure $P_L$ of the apply relay valve of all the clutches and brakes. In this case, for example, it is possible to prevent the line pressure $P_L$ from suddenly flowing into the hydraulic servos and the erroneous operation of the apply relay valve is caused by the reduction of the line pressure in any state such as when the apply relay valve is located in a position in which the apply relay valve is temporarily stuck and operated in error, etc.

As mentioned above, consistent with the hydraulic control apparatus of the automatic transmission in an exemplary embodiment of the present invention, the orifice 30 for regulating the flow rate of the oil path g for inputting the line pressure $P_L$ to the C-1 apply relay valve 23 is arranged. Accordingly, even when the C-1 apply relay valve 23 is operated in error, it is possible to prevent the oil from suddenly flowing into the hydraulic servo 25. The speed change shock can be prevented without preventing the erroneous operation of the C-1 apply relay valve 23 by preventing the reduction of the line pressure $P_L$ by raising the idling rotation number and increasing the size of the oil pump. Namely, the speed change shock can be prevented while fuel cost of the vehicle can be improved and the automatic transmission can be made compact. Further, for example, it is possible to prevent that the line pressure $P_L$ is excessively reduced even when the orifice is arranged in the hydraulic circuit of one frictional engaging element as in the arrangement of the orifice 50 for regulating the flow rate of the oil path s for inputting the line pressure $P_L$ to the B-1 apply relay valve 43, etc. Thus, for example, the erroneous operation of the C-1 apply relay valve 23 can be prevented. Namely, the erroneous operation in the hydraulic circuit of the other frictional engaging element can be prevented.

Further, it is possible to prevent the oil from suddenly flowing into the C-1 hydraulic servo 25 and the speed change shock can be prevented by applying the exemplary embodiment of the present invention to the hydraulic circuit of the clutch C-1 particularly engaged at a comparatively low speed stage even when the C-1 apply relay valve 23 is operated in error in switching from the neutral range to the D-range and the coast state at a comparatively low vehicle speed.

Further, it is possible to prevent the oil from suddenly flowing into the C-3 hydraulic servo and the speed change shock can be prevented by applying the exemplary embodiment of the present invention to the hydraulic circuit of the clutch C-3 particularly engaged at a reverse stage even when the C-3 apply relay valve is operated in error in switching from the neutral range to the R-range.

Further, it is possible to prevent the oil from suddenly flowing into the hydraulic servo 45 of the brake B-1 and a great reduction of the line pressure $P_L$ can be prevented by applying the exemplary embodiment of the present invention to the brake B-1 particularly engaged to perform the hill hold control at the neutral state. Further, the erroneous operation of the C-1 apply relay valve 23 of the clutch C-1 for transmitting power during the neutral control can be prevented and the erroneous engagement of the clutch C-1 can be prevented during the neutral control.

Further, since the brake B-1 is constructed by a band brake, the volume of the operating oil chamber 45a of the hydraulic servo 45 is comparatively large and the line pressure $P_L$ is more greatly reduced when the oil is suddenly flowed-in. However, the great reduction of the line pressure $P_L$ can be prevented since it is possible to prevent the oil from suddenly flowing into the hydraulic servo 45 of the brake B-1.

In the exemplary embodiment, the brake B-1 constructed by the band brake has been explained. However, brake B-1 is not limited to this band brake. It is important to similarly prevent the reduction of the line pressure $P_L$ when the discharge amount of the oil pump is particularly small, etc. even in the brake of a multi-plate type. Accordingly, it is also possible to apply the exemplary embodiment of the present invention to the brake of the multi-plate type instead of the band brake.

Further, in the exemplary embodiment, the explanation has been made with respect to the structure in which the signal pressure is controlled by the solenoid valve and the line pressure is controlled by the control valve controlled by this signal pressure and the control pressure is outputted. However, this structure can be also constructed as a linear solenoid of a direct operating type in which the line pressure is directly adjusted by the operation of the solenoid without interposing the control valve (i.e., the line pressure is adjusted to the control pressure as it is). In this case, the control pressure is used instead of the above signal pressure with respect to the oil pressure (the oil pressure opposed to the modulator pressure through the spool) inputted to switch the spool of the switching valve.

Figure 9:
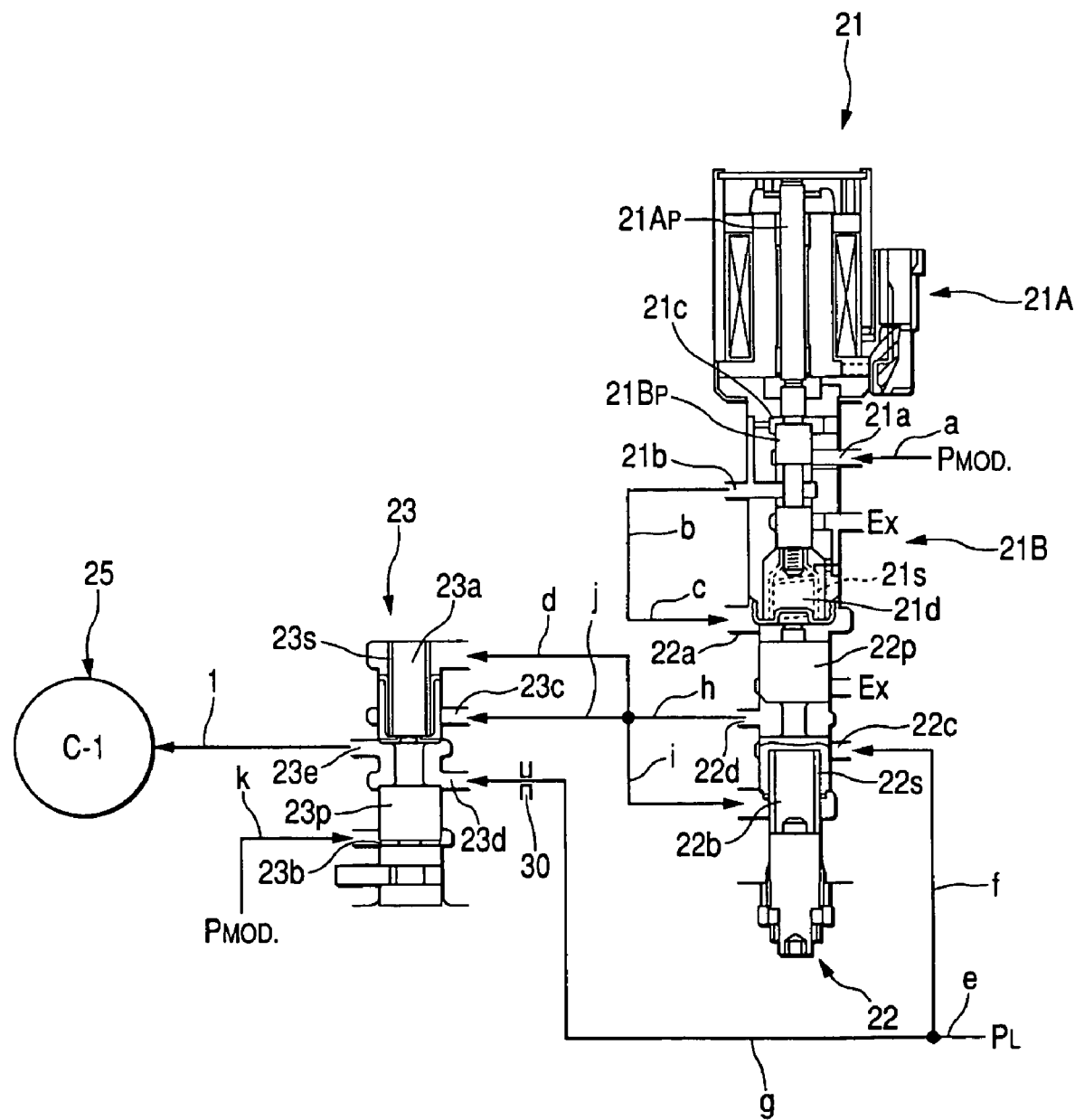
FIG. 9 is a schematic view showing a hydraulic circuit of a clutch C-1 in an alternative exemplary embodiment of the present invention.

Further, in the exemplary embodiment, the signal pressure is inputted to the oil chamber 23a. However, as illustrated in FIG. 9, the control pressure is capable to be inputted to the oil chamber 23a instead of the signal pressure.

The invention is not limited to the above exemplary embodiments, and can be variously modified consistent with the purpose of the invention, and is not intended to exclude them from the scope of the invention.

What is claimed is:

1. A hydraulic control apparatus of an automatic transmission comprising:
   a common oil path for supplying a line pressure;
   a predetermined hydraulic servo operable to control an engaging state of a frictional engaging element on the basis of a supplied oil pressure;
   a control pressure output element;
   a first oil path which diverges from said common path to supply said control pressure output element with the line pressure,
   said control pressure output element comprising a solenoid valve and is operable to output control pressure supplied to the predetermined hydraulic servo by adjusting the line pressure;
   a switching valve;
   a second oil path which diverges from said common path to supply said switching valve with the line pressure,
   said switching valve is operable to input said control pressure and said line pressure supplied from said second oil path and operable to output said control pressure or said line pressure supplied from said second oil path to said predetermined hydraulic servo by selectively switching; and
   a flow rate regulating element disposed in said second oil path, the flow rate regulating element is operable to regulate a flow rate of said second oil path for inputting said line pressure to said switching valve.

2. The hydraulic control apparatus of the automatic transmission according to claim 1, wherein said control pressure output element comprises:
   the solenoid valve, which is operable to output a signal pressure by adjusting a modulated pressure; and
   a control valve operable to output the control pressure by adjusting the line pressure on the basis of the signal pressure of said solenoid valve.

3. The hydraulic control apparatus of the automatic transmission according to claim 2, wherein said switching valve comprises:
   a spool;
   a spring operable to bias the spool in one direction;
   a first oil chamber operable to input the modulated pressure associated with said line pressure at one end of the spool; and
   a second oil chamber operable to input said signal pressure or said control pressure at the other end of the spool,
   wherein said line pressure is outputted to said predetermined hydraulic servo on the basis of a position of said spool when biasing forces of said spring and said signal pressure or said control pressure of said second oil chamber are greater than a biasing force of said modulated pressure associated with said line pressure of said first oil chamber.

4. The hydraulic control apparatus of the automatic transmission according to claim 3, wherein said automatic transmission comprises a multistage type transmission comprising a plurality of frictional engaging elements,
   wherein said automatic transmission performs neutral control for setting the plurality of frictional engaging elements for transmitting power to be in a standby state just before engagement at a neutral state, and
   said predetermined hydraulic servo which is operable to control one of the plurality of frictional engaging elements is operable to control a first brake engaged to perform hill hold control at said neutral state.

5. The hydraulic control apparatus of the automatic transmission according to claim 4, wherein said first brake comprises a band brake.

6. The hydraulic control apparatus of the automatic transmission according to claim 3, wherein said automatic transmission comprises a multistage type transmission comprising a plurality of frictional engaging elements, wherein said automatic transmission is operable to achieve a speed shifting operation by controlling the plurality of frictional engaging elements appropriately, and said predetermined hydraulic servo which is operable to control one of the plurality of frictional engaging elements is operable to control a second clutch engaged at a reverse stage.

7. The hydraulic control apparatus of the automatic transmission according to claim 3, wherein said automatic transmission comprises a multistage type transmission comprising a plurality of frictional engaging elements, wherein said automatic transmission, is operable to achieve a speed shifting operation by controlling the plurality of frictional engaging elements appropriately, and said predetermined hydraulic servo which is operable to control one of the plurality of frictional engaging elements is operable to control a first clutch engaged at a comparatively low speed stage.

8. The hydraulic control apparatus of the automatic transmission according to claim 1, wherein the switching valve is switched on the basis of switching pressure corresponding to the control pressure or a signal pressure.

9. The hydraulic control apparatus of the automatic transmission according to claim 8, wherein predetermined oil pressure associated with the line pressure against the switching pressure is input to the switching valve.

10. The hydraulic control apparatus of the automatic transmission according to claim 9, wherein the control pressure output element comprises:

the solenoid valve, which is operable to output a signal pressure by adjusting a modulated pressure; and a control valve operable to output the control pressure by adjusting the line pressure on the basis of the signal pressure of said solenoid valve, wherein the switching pressure comprises the signal pressure.

11. The hydraulic control apparatus of the automatic transmission according to claim 9, wherein the switching pressure comprises the control pressure.

* * * * *